(12) United States Patent
Post et al.

(10) Patent No.: US 8,972,650 B2
(45) Date of Patent: Mar. 3, 2015

(54) METHODS AND SYSTEMS FOR PERFORMING EFFICIENT PAGE READS IN A NON-VOLATILE MEMORY

(75) Inventors: Daniel J. Post, Campbell, CA (US); Matthew Byom, Campbell, CA (US)

(73) Assignee: Apple Inc., Cupertino, CA (US)

(*) Notice: Subject to any disclaimer, the term of this patent is extended or adjusted under 35 U.S.C. 154(b) by 599 days.

(21) Appl. No.: 13/015,741

(22) Filed: Jan. 28, 2011

(65) Prior Publication Data

US 2012/0198125 A1 Aug. 2, 2012

(51) Int. Cl.
*G06F 12/00* (2006.01)
*G06F 13/00* (2006.01)
*G06F 13/28* (2006.01)
*G06F 12/02* (2006.01)

(52) U.S. Cl.
CPC .................................. *G06F 12/0246* (2013.01)
USPC ............ 711/103; 711/167; 711/168; 711/169

(58) Field of Classification Search
CPC . G06F 11/108; G06F 3/0613; G06F 11/1008; G06F 3/061; G06F 13/1657
USPC .................. 711/103, 167, 168, 169
See application file for complete search history.

(56) References Cited

U.S. PATENT DOCUMENTS

| | | |
|---|---|---|
| 7,187,585 B2 | 3/2007 | Li et al. |
| 7,499,320 B2 | 3/2009 | Li |
| 2008/0140909 A1* | 6/2008 | Flynn et al. .................. 711/100 |
| 2008/0158959 A1 | 7/2008 | Mokhlesi |
| 2009/0216962 A1* | 8/2009 | Mutlu et al. ................. 711/151 |
| 2009/0303789 A1 | 12/2009 | Fernandes |
| 2010/0011153 A1 | 1/2010 | Yeh |
| 2011/0320687 A1* | 12/2011 | Belluomini et al. ......... 711/103 |

* cited by examiner

*Primary Examiner* — Charles Rones
*Assistant Examiner* — Sidney Li
(74) *Attorney, Agent, or Firm* — Van Court & Aldridge LLP

(57) ABSTRACT

Systems and methods are disclosed for increasing efficiency of read operations by selectively adding pages from a pagelist to a batch, such that when the batch is executed as a read operation, each page in the batch can be concurrently accessed. The pagelist can include all the pages associated a read command received, for example, from a file system. Although the pages associated with the read command may have an original read order sequence, embodiments according to this invention re-order this original read order sequence by selectively adding pages to a batch. A page is added to the batch if it does not collide with any other page already added to the batch. A page collides with another page if neither page can be accessed simultaneously. One or more batches can be constructed in this manner until the pagelist is empty.

16 Claims, 5 Drawing Sheets

METHODS AND SYSTEMS FOR PERFORMING EFFICIENT PAGE READS IN A NON-VOLATILE MEMORY

BACKGROUND OF THE DISCLOSURE

NAND flash memory, as well as other types of non-volatile memory ("NVM"), is commonly used in electronic devices for mass storage. For example, consumer electronics such as portable media players often include flash memory to store music, videos, and other media. During use of these electronics, the file system can issue a read command that requests several relatively small "chunks" of data to be read from NVM. These data chunks may be distributed across the NVM and arranged in a read sequence that may not be amenable to efficient die level read operations. Accordingly, systems and methods for increasing efficiency of NVM operations are needed.

SUMMARY OF THE DISCLOSURE

Systems and methods are disclosed for increasing efficiency of read operations by selectively adding pages from a pagelist to a batch, such that when the batch is executed as a read operation, each page in the batch can be concurrently accessed in the NVM. The pagelist can include all the pages associated a read command received, for example, from a file system. Although the pages associated with the read command may have an original read order sequence, embodiments according to this invention re-order this original read order sequence by selectively adding pages to a batch. A page is added to the batch if it does not collide with any other page already added to the batch. A page collides with another page if neither page can be accessed simultaneously in the NVM. One or more batches can be constructed in this manner until the pagelist is empty.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
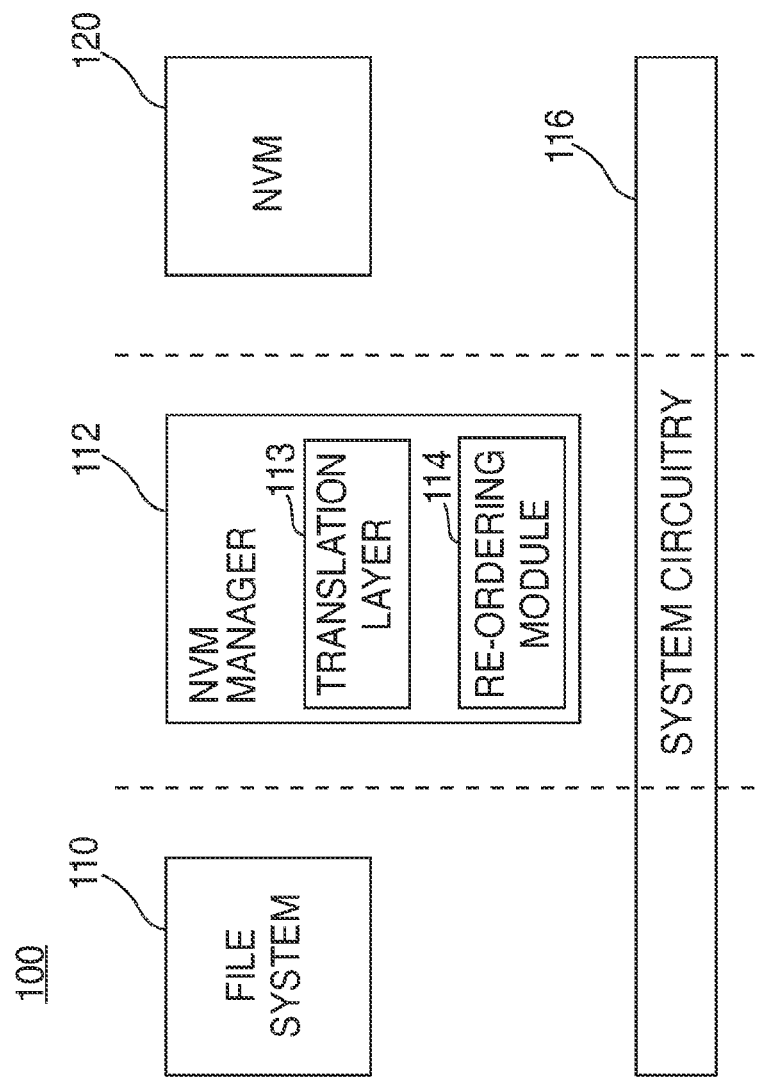
FIG. 1 is an illustrative block diagram of a system in accordance with various embodiments of the invention.

FIG. 1 illustrates a block diagram of a combination of firmware, software, and hardware components of system 100 in accordance with an embodiment of the invention. System 100 can include file system 110, NVM manager 112, system circuitry 116, and NVM 120. In some embodiments, file system 110 and NVM manager 112 may represent various software or firmware modules, and system circuitry 116 may represent hardware.

System circuitry 116 may include any suitable combination of processors, microprocessors, memory (e.g., DRAM), or hardware-based components (e.g., ASICs) to provide a platform on which firmware and software operations may be performed. In addition, system circuitry 116 may include NVM controller circuitry for communicating with NMV 120, and in particular for managing and/or accessing the physical memory locations of NVM 120. Memory management and access functions that may be performed by the NVM controller can include issuing read, write, or erase instructions and performing wear leveling, bad block management, garbage collection, logical-to-physical address mapping, SLC or MLC programming decisions, applying error correction or detection, and data queuing to set up program operations.

In one embodiment, NVM controller circuitry can be implemented as part of a "host" side of system 100. Host side NVM controllers may be used when NVM 120 is "raw NVM" or NVM having limited or no controller functionality. As used herein, "raw NVM" may refer to a memory device or package that may be managed entirely by a controller external to the NVM package. NVM having limited or no controller functionality can include hardware to perform, for example, error code correction, but does not perform memory management functions.

In another embodiment, the NVM controller circuitry can be implemented by circuitry included as part of the package that constitutes NVM 120. That is, the package can include the combination of the NVM controller and raw Nand. Examples of such packages include USB thumbdrives and SDcards.

NVM 120 can include NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof. NVM 120 can be organized into "blocks", which is the smallest erasable unit, and further organized into "pages", which can be the smallest unit that can be programmed or read. In some embodiments, NVM 120 can include multiple dies, where each die may have multiple blocks. The blocks from corresponding die (e.g., blocks having the same position or block number) may form "super blocks". Each memory location (e.g., page or block) of NVM 120 can be addressed using a physical address (e.g., a physical page address or physical block address).

In some embodiments, the memory density of NVM 120 can be maximized using multi-level cell technology. MLC technology, in contrast to single level cell ("SLC") technology, has two or more bits per cell. Each cell is commonly referred to as a page, and in a two-bit MLC NAND, for example, a page is split into an upper page and a lower page. The upper page corresponds to the higher order bit and the lower page corresponds to the lower order bit. Due to device physics, data can be read out of lower pages faster than upper pages.

File system 110 can include any suitable type of file system, such as a File Allocation Table ("FAT") file system or a Hierarchical File System Plus ("HFS+"). File system 110 can manage file and folder structures required for system 100 to function. File system 110 may provide write and read commands to NVM manager 112 when an application or operating system requests that information be read from or stored in NVM 120. Along with each read or write command, file system 110 can provide a logical address indicating where the data should be read from or written to, such as a logical page address or a LBA with a page offset.

File system 110 may provide read and write requests to NVM manager 112 that are not directly compatible with NVM 120. For example, the LBAs may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM manager 112 can perform any functions that are memory-specific, vendor-specific, or both to handle file system requests and perform other management functions in a manner suitable for NVM 120.

NVM manager 112 can include translation layer 113 and re-ordering module 114. In some embodiments, translation layer 113 may be or include a flash translation layer ("FTL"). On a write command, translation layer 113 can map the provided logical address to a free, erased physical location on NVM 120. On a read command, translation layer 113 can use the provided logical address to determine the physical address at which the requested data is stored. For example, translation layer 113 can be accessed to determine whether a given LBA corresponds to a lower page or an upper page of NVM 120. Because each NVM may have a different layout depending on the size or vendor of the NVM, this mapping operation may be memory and/or vendor-specific. Translation layer 113 can perform any other suitable functions in addition to logical-to-physical address mapping. For example, translation layer 113 can perform any of the other functions that may be typical of flash translation layers, such as garbage collection and wear leveling.

Read optimization module 114 may be operative to re-order the sequence in which pages are to be read out of NVM 120. As will be explained in more detail below, it is more efficient to read multiple pages in parallel (e.g., pages in different dies or planes) as opposed to reading pages in a piecemeal fashion (e.g., read a first page in die #1, and then read a second page in die #1, before reading a third in die #2). Read optimization module 114 may process a read command, which includes two or more single page reads, received from file system 110 and determine the best order those single page reads should be read out of NVM 120.

NVM manager 112 may interface with a NVM controller (included as part of system circuitry 116) to complete NVM access commands (e.g., program, read, and erase commands). The NVM controller may act as the hardware interface to NVM 120, and can communicate with NVM package 120 using the bus protocol, data rate, and other specifications of NVM 120.

NVM manager 112 may manage NVM 120 based on memory management data, sometimes referred to herein as "metadata". The metadata may be generated by NVM manager 112 or may be generated by a module operating under the control of NVM manager 112. For example, metadata can include any information used for managing the mapping between logical and physical addresses, bad block management, wear leveling, ECC data used for detecting or correcting data errors, markers used for journaling transactions, or any combination thereof.

The metadata may include data provided by file system 110 along with the user data, such as a logical address. Thus, in general, "metadata" may refer to any information about or relating to user data or used generally to manage the operation and memory locations of a non-volatile memory. NVM manager 112 may be configured to store metadata in NVM 120.

Figure 2:
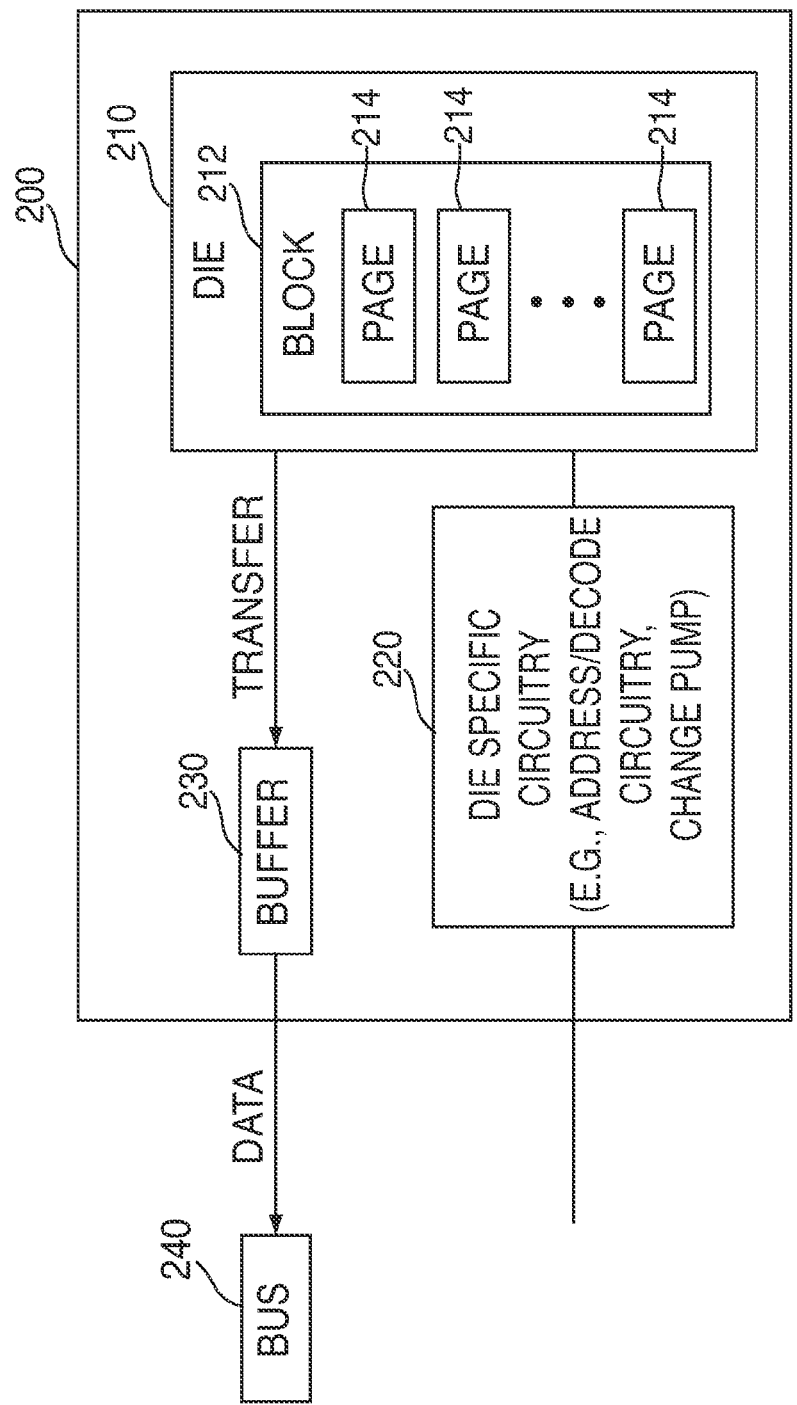
FIG. 2 is an illustrative block diagram showing in more detail a portion of a NVM package in accordance with an embodiment of the invention.

FIG. 2 is an illustrative block diagram showing in more detail a portion of NVM package 200 in accordance with an embodiment of the invention. NVM package 200 can include die 210, buffer 220, and die specific circuitry 230. Die 210 can include a predetermined number of physical blocks 212 and each block can include a predetermined number of pages 214. In some embodiments, pages 214 include upper and lower pages. Pages and blocks represent physical locations of memory cells within die 210. Cells within the pages or blocks can be accessed using die specific circuitry 220.

Die specific circuitry 220 can include circuitry pertinent to the electrical operation of die 210. For example, circuitry 220 can include circuitry such as row and column decode circuitry to access a particular page and charge pump circuitry to provide requisite voltage needed for a read, program, or erase operation. Die specific circuitry 220 is usually separate and distinct from any circuitry that performs management of the NVM (e.g., such as NVM manager 112 of FIG. 1) or any hardware generally associated with a host.

Buffer 230 can be any suitable structure for temporarily storing data. For example, buffer 230 may be a register. In one embodiment, buffer 230 may be the only buffer associated with die 210. Buffer 230 may be used as an intermediary for transferring data between die 210 and bus 240. There are timing parameters associated with how long it takes for data to be transferred between bus 240 and buffer 230, and between buffer 220 and die 210. The timing parameters discussed herein are discussed in reference to read operations.

A read operation can include two parts: (1) a buffer operation, which is a transfer of data read from die 210 to buffer 230, and (2) a bus transfer operation, which is a transfer of data from buffer 230 to bus 240. Both operations have a time component. The buffering operation and the time required to fully perform it are referred to herein as Tbuff. The bus transfer operation and the time required to fully perform it are referred to herein as Txbus.

The read optimization benefits provided by read optimization module 114 and methods according to embodiments of this invention may be realized best in certain hardware configurations. For example, embodiments of this invention may optimize read operations in hardware using a single buffer (such as that shown in FIG. 2) as opposed to hardware having two or more buffers per die capable of caching reads. As another example, embodiments of this invention may optimize read operations in hardware capable of having fast bus transfer operations that are faster than buffer operations.

Figure 3:
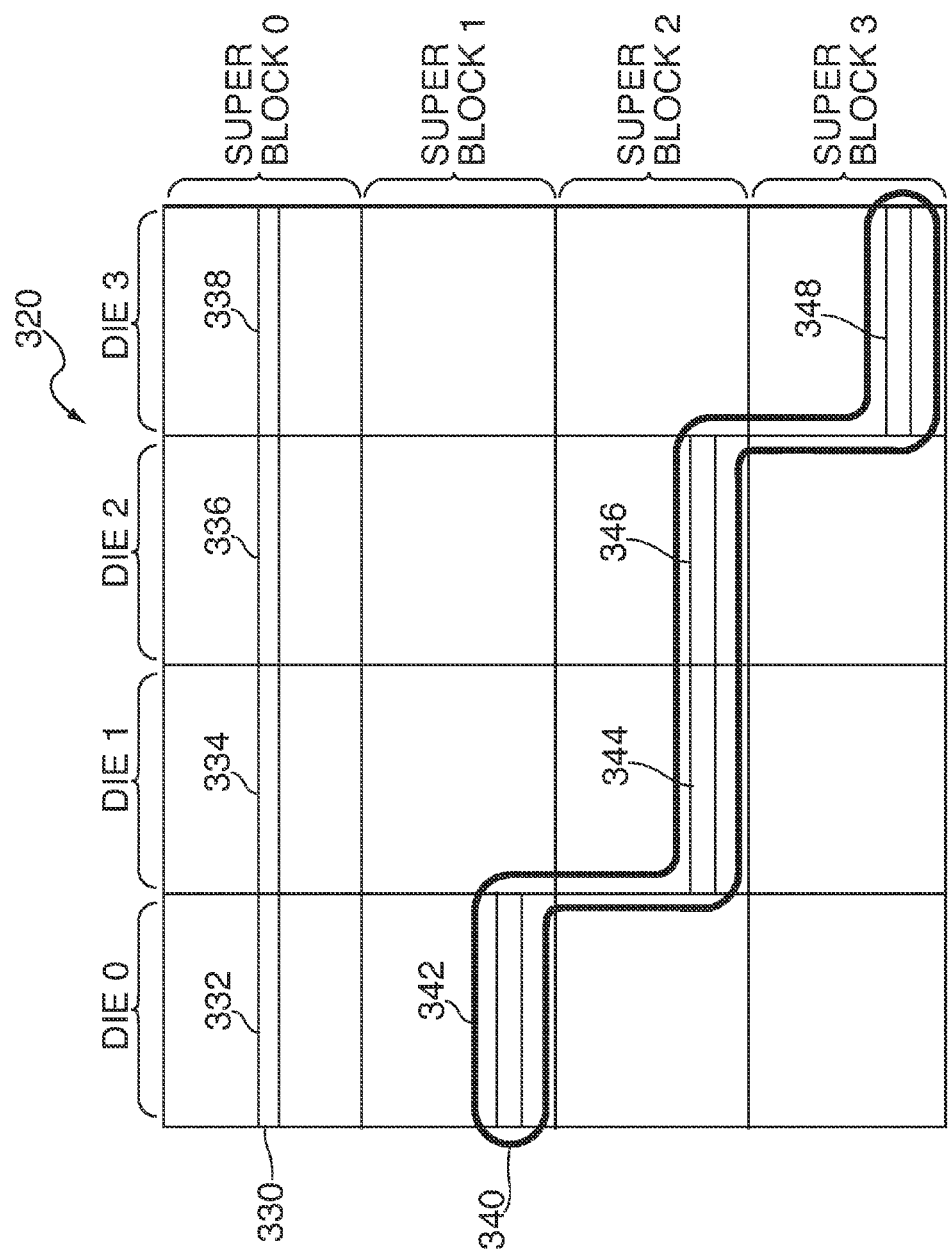
FIG. 3 shows an illustrative block diagram of NVM in accordance with an embodiment of the invention.

As mentioned above, a non-volatile memory (e.g., NVM 120 of FIG. 1), can be organized into dies, blocks, pages, super blocks, and the like. For example, FIG. 3 shows an illustrative block diagram of NVM 320. FIG. 3 is merely meant to illustrate the organizational layout of NVM 320 and do not indicate an actual, physical layout of the non-volatile memory. For example, although die 0 is illustrated as being next to die 1 in FIG. 3, this is merely for illustrating the functional relationship of these dies, and in the actual, physical layout of NVM 320, these dies may or may not be located near one another. Moreover, although a certain number of dies, blocks, and pages are shown in FIG. 3, this is merely for the purpose of illustration and one skilled in the art could appreciate that NVM 320 could include any suitable number of dies, blocks, and pages. NVM 320 can be single level cell (SLC) NVM, multi-level cell (MLC) NVM, or a combination of both SLC and MLC NVM.

As illustrated by FIG. 3, NVM 320 can include one or more dies, such as die 0, die 1, die 2, and die 3. Each die may then be organized into one or more "blocks." For example, die 0 is illustrated as being organized into blocks 0-3. During an erase command of NVM 320, an entire block of memory may be erased at once. Each block of the dies may then be organized into one or more pages. For example, block 0 of die 2 (e.g., block 302), is illustrated as being organized into pages 0-3. During a read or write command of NVM 320, a full page may be read or written at once, respectively. NVM 320 can also include one or more super blocks that include one block from each die. For example, super block 0 of NVM 320 can include block 0 of each of dies 0-3. Similarly, super block 1 of NVM 320 can include block 1 of each of dies 0-3, super block 2 of NVM 320 can include block 2 of each of dies 0-3, and so forth.

Each die may be accessed simultaneously. Thus, when data is either written to or read from NVM 320, a "stripe" of data can be written or read. A "stripe" can include a page from each of one or more dies. For example, FIG. 3 shows stripe 330 of NVM 320. Stripe 330 can include the same page number of each of dies 1-3 of super block 0. During operation of NVM 320, the pages of a stripe and/or super block may be sequentially processed. For example, during a read or write operation of stripe 330, page 332 may be processed, followed by the processing of page 334, then followed by the processing of page 336, and then followed by the processing of page 338.

As another example, FIG. 3 shows stripe 340, which includes pages 342, 344, 346, and 348. Contrary to the pages of stripe 330, the pages in stripe 340 do not all have the same page number in each of dies 1-3, nor do all of pages 342, 344, 346, and 348 exist in the same superblock. Stripe 340 illustrates that a stripe can include a random arrangement of pages from two or more dies. In some embodiments, a stripe can include a page from each of a subset of dies 0-3, and that the subset can either be contiguous or non-contiguous. For example, a stripe can include a page from die 1 and die 2 (i.e., a contiguous subset), or a stripe can include a page from die 1 and die 3 (i.e., a non-contiguous subset). As will be described in more detail below, embodiments of this invention re-order pages to be read so that a maximum possible stripe of pages is read.

Figure 4:
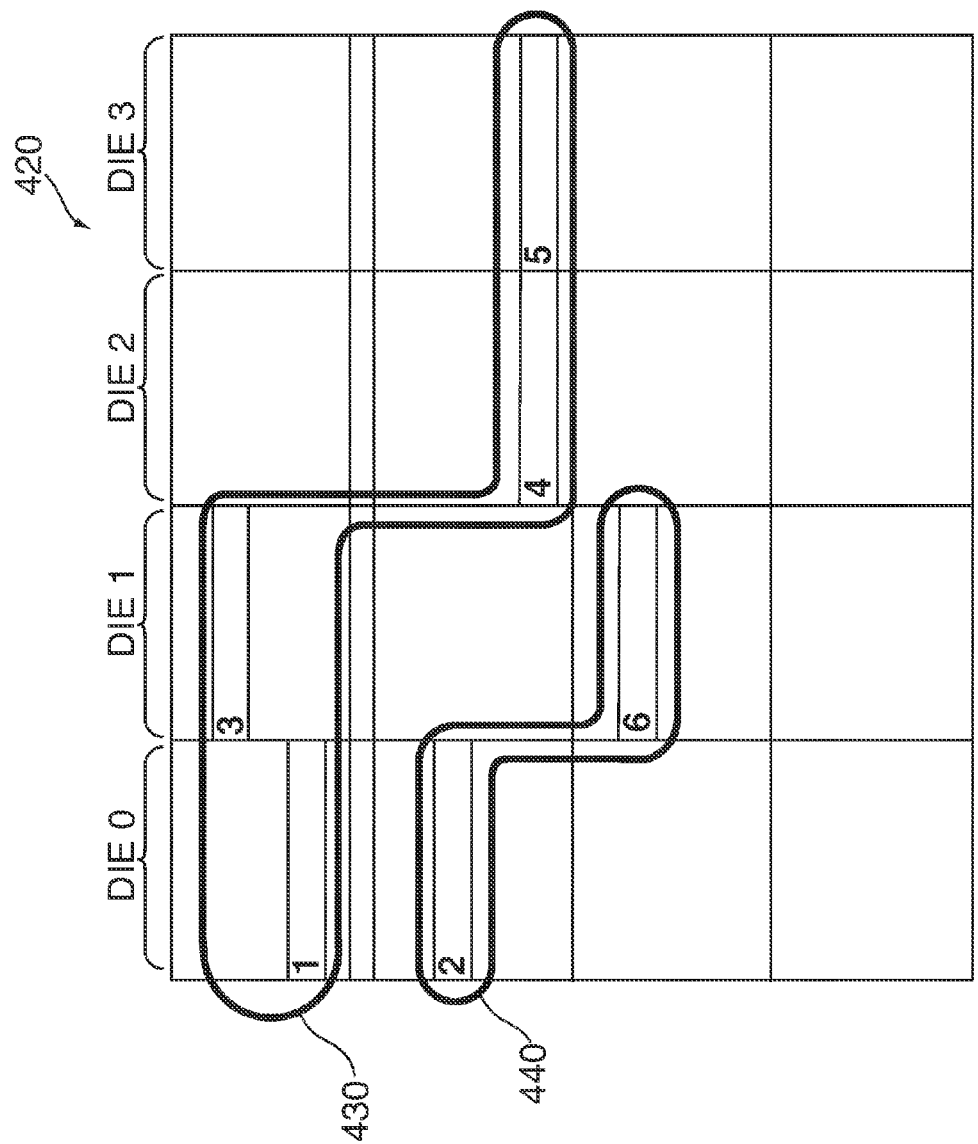
FIG. 4 shows an illustrative block diagram of NVM having pages numbered in an original read order sequence in accordance with an embodiment of the invention.

FIG. 4 shows an illustrative block diagram of NVM 420 having pages numbered according to an order as provided by a file system issued read command. That is, a file system (e.g., file system 110) can issue a read command including LBAs that translate to pages that are not in stripe readable order. Thus, in a conventional approach, when the NVM manager (e.g., NVM manager 112) passes instructions down to the NVM controller to read the appropriate pages, the NVM controller may first read page 1, wait for the data from page 1 to be transferred to a bus, and after the transfer is complete, read data from page 2. After the page 2 data is read, the NVM controller reads page 3, and so on. An inefficiency exists in this approach when the NVM controller has to read two or more pages in sequence from the same die. In this approach, the buffer in die 0 cannot accept data from page 2 until the contents of the buffer have been fully transferred to the bus.

This inefficiency is eliminated using a read optimization module according to an embodiment of the invention. Using this module, the order in which the pages are read is re-arranged to take advantage of concurrent or parallel die access. In effect, the pages are re-arranged to perform stripe reads when possible. Referring to FIG. 4, the read optimization module can re-arrange the read sequence of pages 1, 2, 3, 4, 5 and 6 such that pages 1, 3, 4, and 5 are read as stripe 430, and pages 2 and 6 are read as strip 440. When the NVM manager instructs the NVM controller to read stripe 430, the data in each of pages 1, 3, 4, and 5 are loaded into their respective buffers, and then transferred to the bus or busses. After the bus transfer is complete, the NVM controller can read stripe 440.

Figure 5:
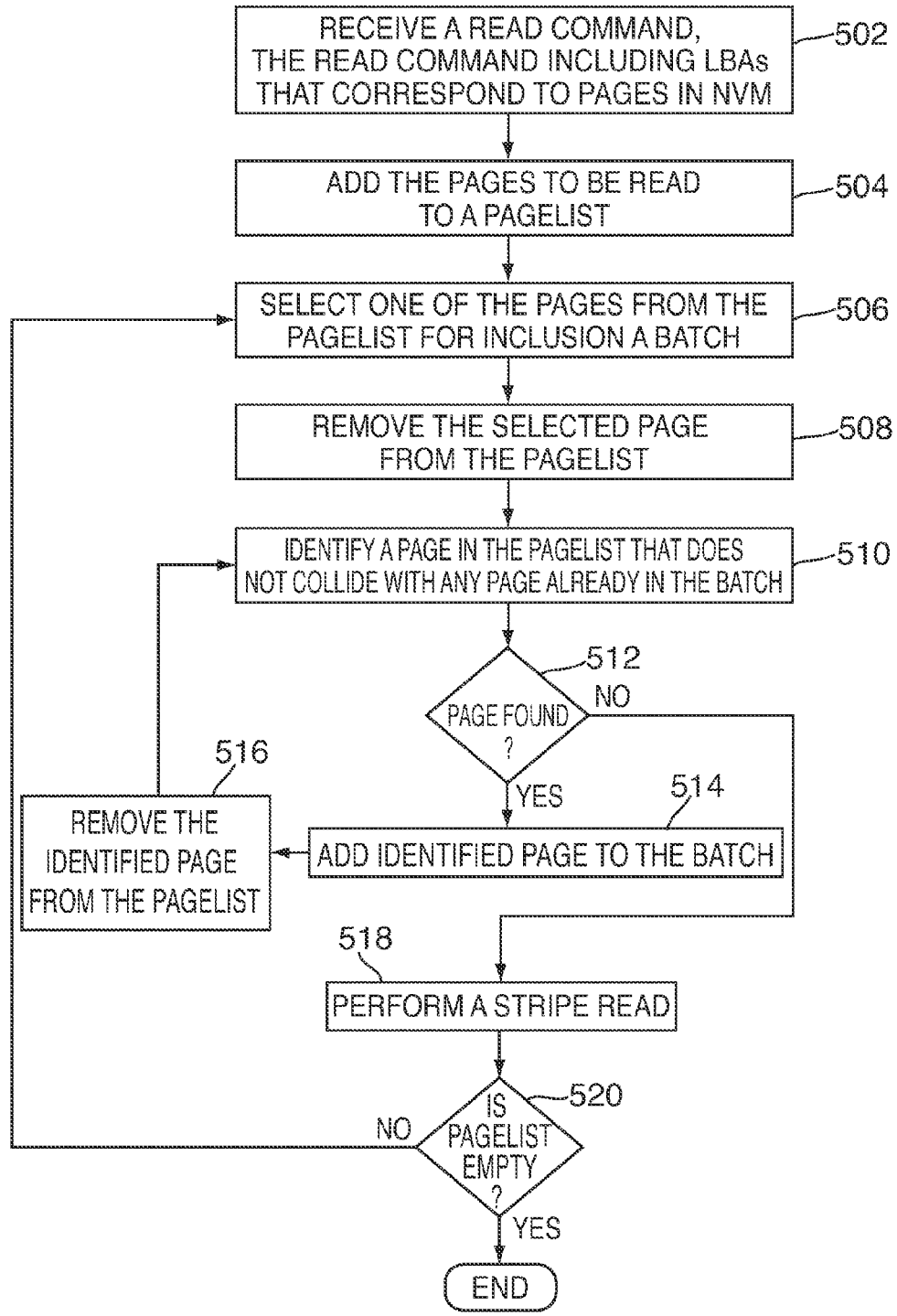
FIG. 5 shows an illustrative flowchart for reading pages efficiently in accordance with an embodiment of the invention.

FIG. 5 is an illustrative flow chart of process steps that may be performed to re-arrange the order in which pages are read from NVM in accordance with an embodiment of the invention. Beginning with step 502, a read command is received. The read command may include an original sequence of LBAs to be retrieved from the NVM. The LBAs are translated to the physical location of pages. Depending on the translation layer used, the LBA may be mapped directly to a page or the LBA may be mapped to a block with page offset.

At step 504, each page (to be read) may be added to a data structure, referred to herein as a pagelist. The pagelist includes a running list of pages that need to be read from NVM. As discussed above, each page is located on a particular die. Information identifying which die or plane the page is located may be stored along with the page in the pagelist. This identifying information may be used by the read optimization module to determine how to arrange the order in which pages are read.

At step 506, one of the pages is selected from the pagelist for inclusion in a batch. The batch can include one or more pages and is transmitted to NVM controller circuitry, which accesses the pages included in the batch. The initial page selected for inclusion in the batch may be any page from the pagelist. For example, the selection may be random or it may be the first page in the pagelist. After a page is selected for inclusion in the batch, that page is removed from the pagelist, as indicated by step 508.

At step 510, the read optimization module attempts to identify a page in the pagelist that does not collide with any page already in the batch. A page can collide with another page if neither page can be accessed concurrently in the NVM. For example, pages located on the same die can collide. As another example, pages located on the same plane can collide. Then, at step 512, a determination is made if a page in the pagelist was identified. If the determination at step 512 is YES, the process proceeds to step 514, which adds the identified page to the batch. At step 516, the identified page that was added to the batch is removed from the pagelist. After step 516, the process loops back to step 510. The loop of steps 510, 512, 514, and 516 can continue to add pages to the batch until no non-colliding pages are identified. When no non-colliding pages can be identified—that is the determination at step 512 is NO—the process proceeds to step 518.

At step 518, each page in the batch is read. Since the batch includes non-colliding pages, the read is performed as a stripe read. That is, each page is concurrently accessed and its respective data is loaded into a register.

At step 520, a determination is made if the pagelist is empty. If the page list is empty, the process end at step 524. If the page list is not empty, the process loops back to step 506.

It should be understood that the steps included in the flowchart of FIG. 5 are merely illustrative. Any of the steps may be removed, modified, or combined, and any additional steps may be added, without departing from the scope of the invention. For example, as an alternative to automatically performing a stripe read based on the batch if the determination at step 512 is NO, embodiments of this invention can delay execution of the stripe read until a predetermined number of batches have been packaged together into a single command. When a predetermined number of batches have been packaged into a command, it may then be released to be processed by a NVM controller (included as part of system circuitry 116) to perform stripe reads for each batch in the packaged command.

The described embodiments of the invention are presented for the purpose of illustration and not of limitation.

What is claimed is:

1. A method comprising:
receiving a read command, the read command including logical block addresses (LBAs) that correspond to a plurality of pages in non-volatile memory (NVM), the NVM comprising a plurality dies, wherein each die comprises a plurality of blocks, and each block comprises a plurality of pages, and wherein each die is associated with each die's own single buffer, and wherein the read command includes LBAs that translate to pages that are not in stripe readable order;
adding the plurality of pages to a pagelist data structure, wherein each page has associated location information;
selecting one of the pages from the pagelist for inclusion in a batch, wherein the selected page corresponds to a first one of the plurality of dies;
identifying at least one other page in the pagelist that does not collide with any page in the batch, wherein each of the least one other page corresponds to a die other than the first one of the plurality of dies, wherein a page collides with another page if neither page can be accessed simultaneously in the NVM;
adding each identified page to the batch to re-order the LBAs included in the read command so that the pages are in stripe readable order; and
concurrently reading each page in the batch such that each page that is read corresponds to a different die, thereby maximizing throughput of data transfer from the dies to a bus.

2. The method of claim 1, further comprising:
removing the selected page from the pagelist.

3. The method of claim 1, further comprising:
removing each identified page that is added to the batch from the pagelist.

4. The method of claim 1, wherein concurrently reading each page in the batch is performed after determining that no other non-colliding pages can be added to the batch.

5. The method of claim 1, wherein the non-volatile memory is nand flash memory.

6. A system comprising:
non-volatile memory ("NVM") comprising a plurality of die, each die having a plurality of blocks each including a plurality of pages, and wherein each die is associated with each die's own single buffer;
a NVM manager operative to communicate with the NVM, the NVM manager operative to:
receive a read command to read a plurality of pages, and wherein the read command includes logical block addresses (LBAs) that translate to pages that are not in stripe readable order;
maintain a pagelist of the plurality of pages to be read;
selectively add at least two of the pages maintained in the pagelist to a batch to re-order the LBAs included in the read command so that the pages are in stripe readable order, wherein each page added to the batch can be concurrently accessed by the NVM when the NVM is instructed to access the pages in the batch, wherein each page added to the pagelist resides on a different one of the plurality of dies.

7. The system of claim 6, wherein the NVM manager is operative to:
remove any page added to the batch from the pagelist.

8. The system of claim 6, wherein the NVM manager is operative to:
instruct the NVM to perform a stripe read on the pages in the batch after determining that no additional pages from the pagelist can be added to the batch.

9. The system of claim 6, wherein the batch is a first batch, and wherein the NVM manager is operative to:
selectively add one or more of the pages maintained in the pagelist to a second batch, wherein each page added to the second batch can be concurrently accessed by the NVM when the NVM is instructed to access the pages in the batch.

10. The system of claim 6, wherein the NVM manager is operative to selectively add pages to at least one batch until the pagelist is empty.

11. The system of claim 6, further comprising:
at least one bus associated with at least two of the dies, and wherein the NVM manager is operative to selectively add pages from the pagelist to a batch dedicated to each of the at least one bus.

12. A method implemented in a system comprising non-volatile memory ("NVM"), at least one bus, and a NVM manager, the method comprising:
receiving a read command to read a plurality of pages dispersed throughout the NVM, wherein the plurality of pages has an original read order sequence not suitable for a stripe read, wherein each stripe read comprises simultaneously accessing at least two different dies to read data from a page in each of the at least two different dies, and wherein each die is associated with each die's own single buffer, and wherein the read command includes logical block addresses (LBAs) that translate to pages that are not in stripe readable order;
adding the plurality of pages to a pagelist;
selectively adding at least two pages from the pagelist to a batch to re-order the LBAs included in the read command so that the pages are in stripe readable order, wherein each page in the batch can be concurrently accessed, and wherein each page in the pagelist resides on a different one of the plurality of dies; and
executing a stripe read on the pages in the batch.

13. The method of claim 12, wherein selectively adding one or more pages from the pagelist to the batch comprises:
selecting a first page from the pagelist and adding the first page to the batch;
determining if at least a second page in the pagelist can be added to the batch; and
adding the at least a second page to the batch if it is determined that the at least a second page can be added to the batch.

14. The method of claim 13, wherein the first page is randomly selected from the pagelist.

15. The method of claim 13, wherein the first page and each of the at least a second page reside on different dies of the NVM.

16. The method of claim 12, wherein the stripe read concurrently accesses at least two pages in the NVM.

* * * * *